United States Patent [19]
Haffner et al.

[11] Patent Number: 5,789,065
[45] Date of Patent: Aug. 4, 1998

[54] LAMINATED FABRIC HAVING CROSS-DIRECTIONAL ELASTICITY AND METHOD FOR PRODUCING SAME

[75] Inventors: William Bela Haffner, Kennesaw; Michael Tod Morman, Alpharetta; Jack Draper Taylor; Jon Edward Tinsley, both of Roswell, all of Ga.

[73] Assignee: Kimberly-Clark Worldwide, Inc., Neenah, Wis.

[21] Appl. No.: 730,511

[22] Filed: Oct. 11, 1996

[51] Int. Cl.$^6$ ............................................. B29C 55/00
[52] U.S. Cl. .................... 428/152; 156/229; 156/244.24; 156/244.26; 442/182; 442/183; 442/184; 442/221; 442/306; 442/328; 442/329; 604/385.1
[58] Field of Search ............................ 156/229, 244.24, 156/244.26; 442/182, 183, 184, 328, 329, 221, 306; 604/385.1; 428/152

[56] References Cited

U.S. PATENT DOCUMENTS

| | | | |
|---|---|---|---|
| 2,182,208 | 12/1939 | Nason et al. | 260/19 |
| 2,779,668 | 1/1957 | Daniels et al. | 51/298 |
| 3,215,648 | 11/1965 | Duffy et al. | 260/2.1 |
| 3,270,846 | 9/1966 | Arledter et al. | 192/107 |
| 3,338,992 | 8/1967 | Kinney | 264/24 |
| 3,341,394 | 9/1967 | Kinney | 161/72 |
| 3,502,538 | 3/1970 | Petersen | 161/150 |
| 3,502,763 | 3/1970 | Hartmann | 264/210 |

(List continued on next page.)

FOREIGN PATENT DOCUMENTS

| | | |
|---|---|---|
| 0180381A3 | 7/1986 | European Pat. Off. . |
| 0202145 | 11/1986 | European Pat. Off. . |
| 0 712 892 | 5/1996 | European Pat. Off. . |
| 2828918 | 1/1979 | Germany . |
| 4211010 | 10/1992 | Germany . |
| 58180573 | 10/1981 | Japan . |
| 59103040 | 6/1984 | Japan . |
| 3150266 | 6/1991 | Japan . |
| 6229434 | 9/1994 | Japan . |
| 2224285 | 2/1990 | United Kingdom . |
| 93/15248 | 8/1993 | WIPO . |

OTHER PUBLICATIONS

A. Knop, W. Scheib, Chemistry and Application of Phenolic Resins, Springer–Verlag, Berlin Heidelberg, NY (1979), pp. 230–232.
Artificial Graphite, Material Safety Data Sheet, prepared Jun. 7, 1991 U.S. Dept. of Labor.
AKZO, Material Safety Data Sheet, prepared Jul. 11, 1991, pp. 1–4.
Jack J. Pigliacamp, Organic Fibers, pp. 54 & 55, E.I. Du Pont de Nemours & Company, Inc.
Freeness of Pulp, T 227 om–85, 1985 TAPPI.
European Search Report—dated Nov. 22, 1994, for EP 94 30 5407.
European Search Report—dated May 4, 1994 for EP 93 11 8967.
Metallocene Catalyst Initiate New Era in Polymer Synthesis, Ann M. Thayer, C & EN, Sep. 11, 1995, p. 15.

*Primary Examiner*—James J. Bell
*Attorney, Agent, or Firm*—James B. Robinson

[57] ABSTRACT

Transversely stretchable elastic laminated fabric with cloth-like facings was made by a two-step process. In the first step an inelastic laminate was made by continuously extruding an elastomer sheet between two plies of a fibrous sheet and joining the plies by applying pressure on them between a closed gap niproll assembly. Two longitudinal slits were made into the laminate. Then the rolls of inelastic laminate so made were taken to an oven and the laminate was unwound and pulled through the oven at an elevated temperature, while tension on the web was increased until the slits necked. The necked laminate was wound up on a takeup roll. When samples were unwound, surprisingly they did not grow in width, and they showed good CD-elasticity (elongation and springback). Breathability of the laminate was superior to the laminate formed using an open niproll assembly gap.

54 Claims, 3 Drawing Sheets

U.S. PATENT DOCUMENTS

| | | | |
|---|---|---|---|
| 3,542,615 | 11/1970 | Dobo et al. | 156/181 |
| 3,692,618 | 9/1972 | Dorschner et al. | 161/72 |
| 3,746,669 | 7/1973 | Dummom et al. | 260/3 |
| 3,802,817 | 4/1974 | Matsuki et al. | 425/66 |
| 3,849,241 | 11/1974 | Butin et al. | 161/169 |
| 3,899,050 | 8/1975 | Savary et al. | 188/73.1 |
| 3,911,045 | 10/1975 | Hartmann et al. | 260/826 |
| 3,927,241 | 12/1975 | Augustin | 428/408 |
| 3,980,729 | 9/1976 | Yokokawa et al. | 260/826 |
| 4,020,226 | 4/1977 | Andrianov et al. | 428/290 |
| 4,041,203 | 8/1977 | Brock et al. | 428/157 |
| 4,051,097 | 9/1977 | Aldrich | 260/38 |
| 4,100,324 | 7/1978 | Anderson et al. | 428/288 |
| 4,209,563 | 6/1980 | Sisson | 428/288 |
| 4,256,801 | 3/1981 | Chuluda | 428/280 |
| 4,259,397 | 3/1981 | Saito et al. | 428/288 |
| 4,320,823 | 3/1982 | Covaleski | 192/107 |
| 4,324,706 | 4/1982 | Tabe et al. | 523/149 |
| 4,340,563 | 7/1982 | Appel et al. | 264/518 |
| 4,352,750 | 10/1982 | Eschen | 523/156 |
| 4,373,038 | 2/1983 | Moraw et al. | 523/156 |
| 4,374,211 | 2/1983 | Gallagher et al. | 523/156 |
| 4,374,888 | 2/1983 | Bornslaeger | 428/198 |
| 4,443,513 | 4/1984 | Meitner et al. | 422/195 |
| 4,451,590 | 5/1984 | Fujimaki et al. | 523/155 |
| 4,456,650 | 6/1984 | Melotik et al. | 428/290 |
| 4,457,967 | 7/1984 | Chareire et al. | 428/212 |
| 4,558,089 | 12/1985 | Koyama et al. | 428/367 |
| 4,563,386 | 1/1986 | Schwartz | 428/283 |
| 4,593,802 | 6/1986 | Danko, Jr. | 192/107 M |
| 4,628,001 | 12/1986 | Sasaki et al. | 428/367 |
| 4,646,900 | 3/1987 | Crawford et al. | 192/107 R |
| 4,656,203 | 4/1987 | Parker | 523/155 |
| 4,657,951 | 4/1987 | Takarada et al. | 523/153 |
| 4,663,220 | 5/1987 | Wisneski et al. | 428/221 |
| 4,663,230 | 5/1987 | Tennent | 428/367 |
| 4,663,368 | 5/1987 | Harding et al. | 523/155 |
| 4,672,082 | 6/1987 | Nakagawa et al. | 523/153 |
| 4,694,937 | 9/1987 | Jonas | 188/73.1 |
| 4,700,823 | 10/1987 | Winckler | 192/107 M |
| 4,707,398 | 11/1987 | Boggs | 428/224 |
| 4,720,415 | 1/1988 | Vander Wielen et al. | 428/152 |
| 4,741,949 | 5/1988 | Morman et al. | 428/224 |
| 4,743,634 | 5/1988 | Royer | 523/150 |
| 4,792,361 | 12/1988 | Double et al. | 106/97 |
| 4,918,116 | 4/1990 | Gardziella et al. | 523/149 |
| 4,965,122 | 10/1990 | Morman | 428/225 |
| 4,983,457 | 1/1991 | Hino et al. | 428/367 |
| 5,004,497 | 4/1991 | Shibata et al. | 75/229 |
| 5,033,596 | 7/1991 | Genise | 192/53 |
| 5,080,969 | 1/1992 | Tokumura | 428/327 |
| 5,083,650 | 1/1992 | Seiz et al. | 192/107 |
| 5,093,388 | 3/1992 | Siemon, Jr. et al. | 523/149 |
| 5,108,820 | 4/1992 | Kaneko et al. | 428/198 |
| 5,114,781 | 5/1992 | Morman | 428/198 |
| 5,116,662 | 5/1992 | Morman | 428/198 |
| 5,143,679 | 9/1992 | Weber et al. | 264/288.8 |
| 5,151,092 | 9/1992 | Buell et al. | 604/385.2 |
| 5,156,789 | 10/1992 | Amaral et al. | 264/160 |
| 5,167,897 | 12/1992 | Weber et al. | 264/288.8 |
| 5,169,706 | 12/1992 | Collier, IV et al. | 428/152 |
| 5,196,000 | 3/1993 | Clear et al. | 604/385.2 |
| 5,226,992 | 7/1993 | Morman | 156/62.4 |
| 5,290,627 | 3/1994 | Ikuta | 428/224 |
| 5,304,599 | 4/1994 | Himes | 525/98 |
| 5,316,837 | 5/1994 | Cohen | 428/285 |
| 5,320,891 | 6/1994 | Levy et al. | 428/108 |
| 5,332,613 | 7/1994 | Taylor et al. | 428/152 |
| 5,334,446 | 8/1994 | Quantrille et al. | 428/284 |
| 5,336,545 | 8/1994 | Morman | 428/152 |
| 5,336,552 | 8/1994 | Strack et al. | 428/224 |
| 5,382,400 | 1/1995 | Pike et al. | 264/168 |
| 5,462,708 | 10/1995 | Swenson et al. | 264/174.11 |
| 5,492,753 | 2/1996 | Levy et al. | 428/219 |
| 5,514,470 | 5/1996 | Haffner et al. | 428/284 |

LAMINATED FABRIC HAVING CROSS-DIRECTIONAL ELASTICITY AND METHOD FOR PRODUCING SAME

FIELD OF THE INVENTION

The present invention relates to nonwoven fabrics, and more particularly to a nonwoven fabric having desirable cross-directional elastic properties, produced by extruding an elastomeric sheet between two sheets of unnecked fibrous material, and pressing the layers between a niproll assembly to form a laminate. The laminate is then necked at an elevated temperature.

BACKGROUND OF THE INVENTION

Laminated fabric structures possess certain desirable characteristics over nonlaminated structures, including high tensile strength. In general, the process of producing a laminated fabric comprises providing a first and second sheet of fabric, and bonding the two sheets together, often by inserting a third sheet layer between the two sheets. The fabric sheets are commonly made by any one of a number of processes, including spunbonding, meltblowing, carding and bonding, and the like. The sheets can also be laminates of fabric layers. The sheet may have adhering properties which enable it to bond to both sheets of fabric. Usually, the three layer material is passed through a niproll, or similar assembly, to press the layers together, commonly immediately after the sandwich has been formed. The niproll squeezes the layers together, enabling the center sheet to adhere to both sheets. The resulting laminate structure can be post-treated, if desired, for obtaining certain characteristics.

Heretofore, to provide laminates with cross-directional extensibility and retraction, the sheets of fabric were necked prior to applying the elastomer sheet and an elastomeric polymer was used to make the sheet. Necking is the process of reducing the width of a fabric sheet by stretching the fabric lengthwise. The necking process typically involves unwinding a sheet from a supply roll and passing it through a brake niproll assembly driven at a given linear speed. A takeup roll, operating at a linear speed higher than the brake niproll, draws the fabric and generates tension in the fabric needed to elongate and neck. Frequently, the necking operation occurs in the presence of a heat source contacting the material during necking. U.S. Pat. No. 4,965,122 issued to Morman, and commonly assigned to the assignee of the present invention, discloses a reversibly necked nonwoven unlaminated material which may be formed by necking the material, then heating the necked material, followed by cooling the necked material.

The nature of necking is often such that the edges of the spunbond material neck to the greatest degree and the central area necks the least, meaning that the resulting stretchable laminate slits from the edges have the highest extensibility. This uneven necking has given rise to the term "smile profile" to describe the extensibility profile. This phenomenon causes a difference in properties of the individual narrow slits taken from the edges versus slits taken from the center of the web. It would be desirable to have a necked fabric having greater uniformity of extensibility, regardless from where the sample is taken across a fabric sheet width, because the extensibility of the fabric strongly influences the elastic quality of the laminate made with it.

In forming the laminate, the fabric sheets are aligned to feed continuously in an intersecting relationship, creating a contact zone at their intersection into which the elastomeric sheet is inserted, applied or created over.

In the prior art the niproll has a gap during laminate formation. If the niproll gap is too large, there will be insufficient pressure applied to the layers and adhesion of the sheet to the fabric sheets will be inadequate, producing a laminate that will have poor peel characteristics. If the gap is too small, the fabric will be too stiff because the elastomer penetrates too far into the fabric sheets, reducing fiber flexibility and mobility. Thus, a completely closed niproll has heretofore been considered undesirable for optimum elastic properties. Additionally, the temperature of the molten elastomer extruded between the necked facings has a strong influence on the facings-to-sheet adhesion.

SUMMARY OF THE INVENTION

The present invention provides a laminated material formed by laminating an elastomeric sheet to at least one, and preferably between two sheets of unnecked fabric material, followed by necking the laminate, preferably at an elevated temperature. Also provided is an apparatus and a method to form the laminate. In a preferred embodiment, an elastomeric sheet layer is extruded from a die and inserted between two sheets of unnecked spunbond material provided from supply rolls. The spunbond sheets approach a contact zone at an intersecting angle and form a sandwich with the elastomeric sheet. The multilayer material is then passed through a niproll assembly, wherein the niproll assembly preferably is closed (as compared to having a gap between the rolls). In this process the laminate can be slit first and then "individually" necked so that each slit will have essentially the same properties. The laminate is preferably necked before, during or after contact with a heat source, such as an oven, fan and heated air supply, or the like, so as to soften the elastomeric layer of the laminate. As the laminate is heated at its necked width, the elastomeric sheet loses its pre-necked memory and the memory is "reset" in the necked condition by subsequent cooling. During the necking and heating process, the fabric layer acts as a support for the softened elastomeric layer.

The resulting product has desirable elasticity characteristics. An unexpected result was that the closed nirolls produced a laminate with more desirable breathability and peel data than a gapped niproll.

It is a principal object of the present invention to provide a nonwoven fabric having desirable cross-directional elasticity.

It is another object of the present invention to provide a process for producing a nonwoven fabric which improves uniformity of cross-directional elasticity.

It is another object of the present invention to provide a process for producing a nonwoven fabric which improves breathability.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Definitions

As used herein the term "nonwoven fabric or web" means a web having a structure of individual fibers or threads which are interlaid, but not in an identifiable manner as in a woven fabric. Nonwoven fabrics or webs have been formed by many processes such as for example, meltblowing processes, spunbonding processes, and bonded-carded-web processes. The basis weight of nonwoven fabrics is usually expressed in ounces of material per square yard (osy) or grams per square meter (gsm) and the fiber diameters useful are usually expressed in microns. (Note: to convert from osy to gsm, multiply osy by 33.91).

As used herein the term "composite elastic material" refers to an elastic material which may be a multicomponent material or a multilayer material. For example, a multilayer material may have at least one elastic layer joined to at least one gatherable layer at least at two locations so that the gatherable layer is gathered between the locations where it is joined to the elastic layer. Such a multilayer composite elastic material may be stretched to the extent that the nonelastic material gathered between the bond locations allows the elastic material to elongate. This type of multilayer composite elastic material is disclosed, for example, by U.S. Pat. No. 4,720,415 to Vander Wielen et al.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. 3,502,538 to Levy, and U.S. Pat. No. 3,542,615 to Dobo et al. Spunbond fibers are generally not tacky when they are deposited onto a collecting surface. Spunbond fibers are generally continuous and have average diameter larger than about 7 microns, more particularly, between about 5 and 40 microns.

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Buntin. Meltblown fibers are microfibers which may be continuous or discontinuous, and generally smaller than about 100 microns in average diameter.

As used herein the term "polymer" generally includes, but is not limited to, homopolymers, copolymers, such as for example, block, graft, random and alternating copolymers, terpolymers, etc., and blends and modifications thereof. Furthermore, unless otherwise specifically limited, the term "polymer" shall include all possible geometrical molecular configuration of the material. These configurations include, but are not limited to isotactic, syndiotactic and atactic symmetries.

As used herein, the term "metallocene" means polyolefins produced by metallocene-catalyzed polymerization reactions. Such catalysts are reported in "Metallocene Catalysts Initiate New Era in Polymer Synthesis," Ann M. Thayer, C&EN, Sep. 11, 1995, p. 15.

As used herein, the term "machine direction" or "MD" means the length of a fabric in the direction in which it is produced. The term "cross machine direction" or "CD" means the width of fabric, i.e., a direction generally perpendicular to the MD.

As used herein the term "monocomponent" fiber refers to a fiber formed from one or more extruders using only one polymer. This is not meant to exclude fibers formed from one polymer to which small amounts of additives have been added for coloration, anti-static properties, lubrication, hydrophilicity, etc. These additives, e.g., titanium dioxide for coloration, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other, though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another, or may be a side-by-side arrangement, or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein, the terms "necking" or "neck stretching" interchangeably refer to a method of elongating a nonwoven fabric, generally in the machine direction, to reduce its width (measured along the surface of the material) in a controlled manner to a desired amount. The controlled stretching may take place at room temperature or higher temperatures and is limited to an increase in overall dimension in the direction being stretched up to the elongation required to break the fabric. When relaxed, the web dimensions tend toward their original dimensions. Necking typically involves a brake niproll operating at a linear rate X and a takeup niproll operating at a linear rate Y, where Y is greater than X, producing a ratio R (X:Y) of rates, so as to place tension on the fabric stretched therebetween. The ratio R can be about 1:1.25, or greater or lesser. Such a process is disclosed, for example, in U.S. Pat. Nos. 4,443,513 to Meitner and Notheis, and U.S. Pat. Nos. 4,965,122; 4,981,747 and 5,114,781 to Morman.

As used herein, the term "neckable material" means any material which can be necked.

As used herein, the term "necked material" refers to any material which has been constricted in at least one dimension by processes such as, for example, drawing.

As used herein, the term "gathering" refers to a process of reducing the initial fabric width to a gathered width by passing the fabric between at least one pair of guides disposed on either edge of the fabric, the distance between the guides being less than the initial fabric width, i.e., constraining the pathway of the fabric width. A plurality of pairs of guides, matched or unmatched, can be used to incrementally reduce the initial fabric width, in effect bunching the fabric. The guides can be fixed or rotate on bearings. Preferably, the guides, if fixed, have a smooth surface so as to minimize the possibility of fabric catching on the guides. Typically, gathering does not apply appreciable tension to the fabric.

As used herein, the term "zero strain" stretch bonding generally refers to a process wherein at least two layers are bonded to one another while in an untensioned (hence zero strain) condition and wherein one of the layers is stretchable and elastomeric and the second is stretchable but not necessarily elastomeric. Such a laminate is stretched incrementally through the use of one or more pairs of meshing corrugated rolls which reduce the strain rate experienced by the web. "Zero strain stretch laminate" refers to a composite elastic material made according to the zero strain stretch bonding process, i.e., the elastic and nonelastic layers are joined together when both layers are in an unextended condition and stretched through meshing corrugated rolls. The second layer, upon stretching of the laminate, will be at least to a degree, permanently elongate so that the laminate will not return to its original undistorted condition upon release of the stretching force. This results in z-direction bulking of the laminate and subsequent elastic extensibility in the direction of initial stretching at least up to the point of initial stretching. Examples of such laminates and their production processes may be found in U.S. Patent Nos. 5,143,679; 5,151,092; 5,167,897; and 5,196,000.

As used herein, the terms "elastic" and "elastomeric" when referring to a fiber, sheet or fabric mean a material which upon application of a biasing force, is stretchable to a stretched, biased length which is at least about 160 percent of its relaxed, unstretched length, and which will recover at least 55 percent of its elongation upon release of the stretching, biasing force within about one minute.

As used herein the term "recover" refers to a contraction of a stretched material upon termination of a biasing force following stretching of the material by application of the biasing force. For example, if a material having a relaxed, unbiased length of one (1) inch was elongated 50 percent by stretching to a length of one and one half (1.5) inches the material would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its elongation.

As used herein the term "protective apparel" means articles including, but not limited to, surgical gowns, isolation gowns, coveralls, lab coats and the like.

As used herein the term "personal care absorbent products" means articles including, but not limited to, diapers, adult incontinence products, feminine hygiene products and garments, and child care training pants.

DETAILED DESCRIPTION

The present invention comprises a laminated fabric structure having desirable CD elasticity. In general, at least one and preferably a plurality of sheets of an unnecked fabric material are first laminated to a sheet of an elastic material and then necked, preferably at an elevated temperature. While nonwoven fabrics are preferred, knits or loosely woven fabrics can also be used in the present invention.

Figure 1:
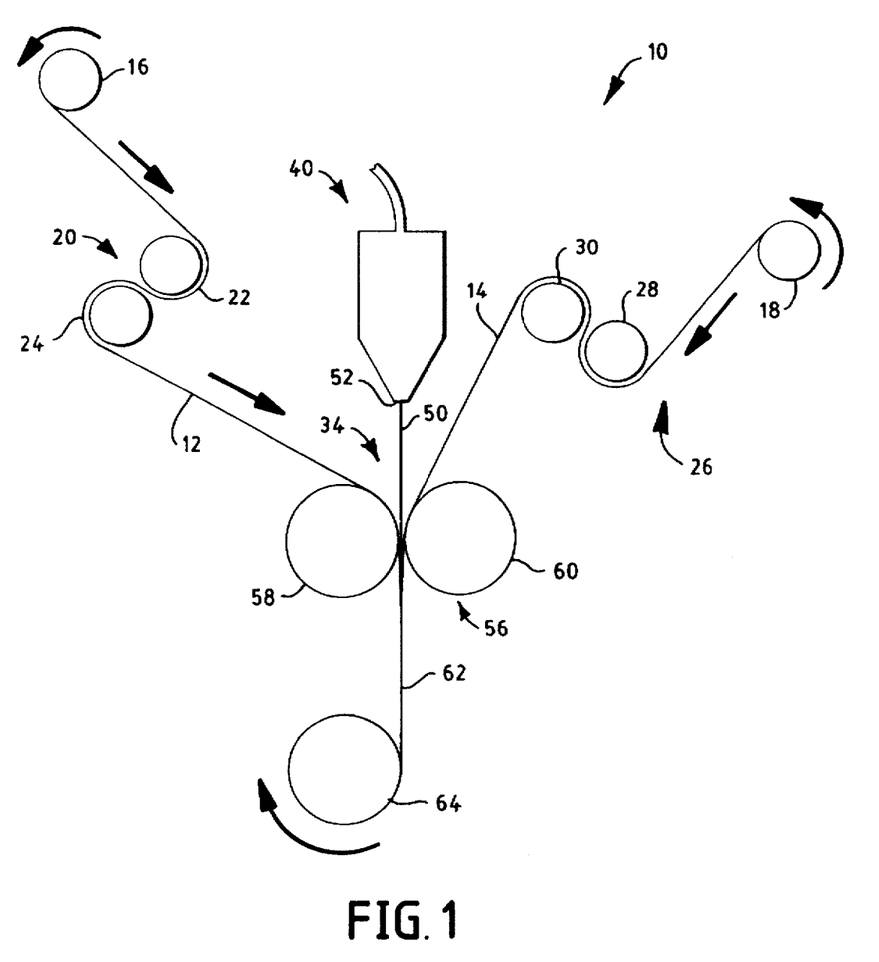
FIG. 1 is a schematic view of an apparatus for performing the lamination according to the method of the present invention.

FIG. 1 shows an apparatus 10 for continuously forming the laminate of the present invention, a first sheet of fabric 12 and a second sheet of fabric 14, each sheet comprising a preferably unnecked nonwoven material. The term "sheet" means a length of fabric, preferably provided on a supply roll, however pieces of fabric material can be used, such as in a batch lamination process. The sheets 12 and 14 can be can be formed by any of a number of processes well-known in the art. Such processes include, but are not limited to, carding and bonding, spunbonding, meltblowing, and the like. The sheets may be formed by the same or different processes and made of the same or different starting materials. The fabric of this invention may be a multilayer laminate. An example of a multilayer laminate is an embodiment wherein some of the layers are spunbond and some are meltblown, such as a spunbond/meltblown/spunbond (SMS) laminate as disclosed in U.S. Pat. No. 4,041,203 to Brock et al., U.S. Pat. No. 5,169,706 to Collier, et al, and U.S. Pat. No. 4,374,888 to Bornslaeger. Such a laminate may be made by sequentially depositing onto a moving forming belt first a spunbond fiber layer, then a meltblown fiber layer and last another spunbond fiber layer, and then bonding the laminate in a manner described in the aforementioned patents. Alternatively, the fabric layers may be made individually, collected in rolls, and combined in a separate bonding step. Such fabrics usually have a basis weight of from about 0.1 to about 12 osy (about 3.4 to about 400 gsm), or more particularly from about 0.75 to about 3 osy (about 25.4 to about 101.73 gsm). The above stated processes are well known in the art and need not be reviewed herein. For the purposes of the present discussion, the preferred embodiment uses a spunbond fabric for both the first and second sheets 12 and 14. It is to be understood that the present invention can be practiced using a single sheet of fabric laminated to the elastic material.

While the sheets 12 and/or 14 are preferably unnecked, it is also possible for the sheets 12 and 14 to be necked to some degree prior to the lamination step. In this scenario the sheets 12 and 14 undergo a second necking process after lamination. For example, a sheet may be necked in from a starting width of 100 inches (2540 cm) to a width of 80 inches (2032 cm) and thereafter processed into the laminate of this invention.

The sheets 12 and 14 are commonly pre-formed into supply rolls 16 and 18 and are subsequently unwound as needed. Alternatively, the laminate of the present invention can be produced whereby the sheets 12 and 14 are formed by the desired process and immediately transferred to guide rolls and continuously advanced into the process described hereinbelow.

Elastomeric thermoplastic polymers useful in the practice of this invention as the elastic layer may be, but are not limited to, those made from block copolymers such as polyurethanes, copolyether esters, polyamide polyether block copolymers, ethylene vinyl acetates (EVA), block copolymers having the general formula A—B—A' or A—B like copoly(styrene/ethylene-butylene), polystyrene-poly(ethylene-propylene)polystyrene, polystyrene-poly(ethylene-butylene)-polystyrene, (polystyrene/poly(ethylene-butylene)/polystyrene, poly(styrene/ethylene-butylene/polystyrene), metallocene-catalyzed ethylene-(butene or hexene or octene) copolymers of a density of about 0.866–0.910 g/cc) and of highly stereo-regular molecular structure, and the like.

Useful elastomeric resins include, but are not limited to, block copolymers having the general formula A—B—A' or A—B, where A and A' are each a thermoplastic polymer endblock which contains a styrenic moiety such as a poly(vinyl arene) and where B is an elastomeric polymer midblock such as a conjugated diene or a lower alkene polymer. Block copolymers of the A—B—A' type can have different or the same thermoplastic block polymers for the A and A' blocks, and the present block copolymers are intended to embrace linear, branched and radial block copolymers. In this regard, the radial block copolymers may be designated (A—B)m-X, wherein X is a polyfunctional atom or molecule and in which each (A—B)m- radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer", and particularly A—B—A' and A—B block copolymer, is intended to embrace all block copolymers having such rubbery blocks and thermoplastic blocks as discussed above, which can be extruded (e.g., by meltblowing and sheet forming), and without limitation as to the number of blocks. The elastomeric nonwoven web may be formed from, for example, elastomeric (polystyrene/poly(ethylene-butylene)/polystyrene) block copolymers. Commercial examples of such elastomeric copolymers are, for example, those known as KRATON® materials which are available from Shell Chemical Company of Houston, Tex. KRATON® block copolymers are available in several different formula numb, a number of which are identified in U.S. Pat. Nos. 4,663,220 and 5,304,599, hereby incorporated by reference.

Polymers composed of an elastomeric A—B—A—B tetrablock copolymer may also be used in the practice of this invention as the elastic layer. Such polymers are discussed in U.S. Pat. No. 5,332,613 to Taylor et al. In such polymers, A is a thermoplastic polymer block and B is an isoprene monomer unit hydrogenated to a substantially a poly(ethylene-propylene) monomer unit. An example of such a tetrablock copolymer is a styrene-poly(ethylene-propylene)-styrene-poly(ethylene-propylene) or SEPSEP elastomeric block copolymer available from the Shell Chemical Company of Houston, Tex. under the trademark KRATON®.

Other exemplary elastomeric materials which may be used include polyurethane elastomeric materials such as, for example, those available under the trademark ESTANE® from B. F. Goodrich & Co. or MORTHANE® from Morton Thiokol Corp., polyester elastomeric materials such as, for example, those available under the trade designation HYTREL® from E. I. DuPont De Nemours & Company, and those known as ARNITEL®, formerly available from Akzo Plastics of Arnhem, Holland and now available from DSM of Sittard, Holland.

Another suitable material is a polyester block amide copolymer having the formula:

where n is a positive integer, PA represents a polyamide polymer segment and PE represents a polyether polymer segment. In particular, the polyether block amide copolymer has a melting point of from about 150° C. to about 170° C., as measured in accordance with ASTM D-789; a melt index of from about 6 grams per 10 minutes to about 25 grams per 10 minutes, as measured in accordance with ASTM D-1238, condition Q (235 C./1 Kg load); a modulus of elasticity in flexure of from about 20 Mpa to about 200 Mpa, as measured in accordance with ASTM D-790; a tensile strength at break of from about 29 Mpa to about 33 Mpa as measured in accordance with ASTM D-638 and an ultimate elongation at break of from about 500 percent to about 700 percent as measured by ASTM D-638. A particular embodiment of the polyether block amide copolymer has a melting point of about 152° C. as measured in accordance with ASTM D-789; a melt index of about 7 grams per 10 minutes, as measured in accordance with ASTM D-1238, condition Q (235 C./1 Kg load); a modulus of elasticity in flexure of about 29.50 Mpa, as measured in accordance with ASTM D-790; a tensile strength at break of about 29 Mpa, a measured in accordance with ASTM D-639; and an elongation at break of about 650 percent as measured in accordance with ASTM D-638. Such materials are available in various grades under the trade designation PEBAX® from ELF Atochem Inc., Philadelphia, Pa. Examples of the use of such polymers may be found in U.S. Pat. Nos 4,724,184, 4,820,572 and 4,923,742 hereby incorporated by reference, to Killian et al. and assigned to the same assignee as this invention.

Elastomeric polymers also include copolymers of ethylene and at least one vinyl monomer such as, for example, vinyl acetates, unsaturated aliphatic monocarboxylic acids, and esters of such monocarboxylic acids. The elastomeric copolymers and formation of elastomeric nonwoven webs from those elastomeric copolymers are disclosed in, for example, U.S. Pat. No. 4,803,117.

The thermoplastic copolyester elastomers include copolyetheresters having the general formula:

where "G" is selected from the group consisting of poly(oxyethylene)-alpha,omega-diol, poly(oxypropylene)-alpha, omega-diol, poly(oxytetramethylene)-alpha,omega-diol and "a" and "b" are positive integers including 2, 4 and 6, "m" and "n" are positive integers including 1–20. Such materials generally have an elongation at break of from about 600 percent to 750 percent when measured in accordance with ASTM D-638 and a melt point of from about 350° F. to about 400° F. (176° to 205° C.) when measured in accordance with ASTM D-2117.

Commercial examples of such copolyester materials are, for example, those known as ARNITEL®, formerly available from Akzo Plastics of Arnhem, Holland and now available from DSM of Sittard, Holland, or those known as HYTREL® which are available from E.I. duPont de Nemours of Wilmington, Del. Formation of an elastomeric nonwoven web from polyester elastomeric materials is disclosed in, for example, U.S. Pat. No. 4,741,949 to Morman et al. and U.S. Pat. No. 4,707,398 to Boggs, hereby incorporated by reference.

The neckable material may be made of fiber forming polymers such as, for example, nylons, polyesters and polyolefins. Exemplary polyolefins include one or more of polypropylene, polyethylene, ethylene copolymers, propylene copolymers, and butene copolymers. Useful polypropylenes include, for example, polypropylene available from the Montell North America Corporation, Wilmington, Del., under the trade designation PF-301, polypropylene available from the Exxon Chemical Company under the trade designation Exxon 3445, and polypropylene available from the Shell Chemical Company under the trade designation DX 5A09.

The sheet 12 may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbant materials, occurs prior to collection of the meltblown fibers upon a collecting device to form a coherent web of randomly dispersed meltblown fibers and other materials such as disclosed in U.S. Pat. No. 4,100,324, the disclosure of which is hereby incorporated by reference.

In a preferred embodiment, one or both of the sheets 12 and 14 can, for added strength of the end laminate of the present invention, have fibers oriented in a generally uniform direction, or even in a random direction. Such sheets can be formed by any of a number of processes or techniques well known to those of ordinary skill in the art. The result of such processes is that the fiber orientation is at an angle or vector with respect to the machine direction of the sheet. Preferably, the fiber orientation vector in the unnecked material (from the machine direction of the sheet) is from about 0° to about 75°, more preferably from about 30° to about 60°. It appears possible to use vectors exceeding 45° because after necking the vectors will be reduced to smaller vectors, still improving strength of the laminate, as will be described in greater detail hereinbelow.

The first sheet 12 is unwound from the supply roll 16 and second sheet 14 is unwound from the supply roll 18. The sheets 12 and 14 then travel in the direction indicated by the arrows associated therewith as the supply rolls 16 and 18 rotate in the direction of the arrows associated therewith. The sheet 12 then passes through the nip of an S-roll arrangement 20 formed by the stack rollers 22 and 24. Likewise, the sheet 14 passes through the nip of an S-roll arrangement 26 formed by the stack rollers 28 and 30. The sheets 12 and 14 are configured to advance in an intersecting relationship to form a contact zone 34 located beneath an assembly 40.

A sheet 50 of elastic material, occasionally referred to herein as a film, is either formed in situ or made previously and unwound from a supply roll (not shown). The sheet 50 is preferably formed, as shown in FIG. 1, by extruding an elastomeric polymer through a die 52. The sheet 50 is preferably an elastomeric polymer selected from the group consisting of elastic polyesters, elastic polyurethanes, elastic polyamides, elastic polyolefins, metallocenes and elastic A—B—A' block copolymers, where A and A' are the same or different thermoplastic polymers, and where B is an elastomeric polymer block. A preferred polymer is Kraton® G2755 compound, which is a blend of an elastomeric polymer, a polyolefin, and a tackifying resin. Any tackifier resin can be used which is compatible with the elastomeric polymer and can withstand the high processing (e.g., extrusion) temperatures. If blending materials such as, for example, polyolefins or extending oils are used, the tackifier resin should also be compatible with those blending materials. Generally, hydrogenated hydrocarbon resins are preferred tackifying resins, because of their better temperature stability. REGALREZ™ and ARKON™ P series tackifiers are examples of hydrogenated hydrocarbon resins. ZONATAK™ 501 lite is an example of a terpene hydrocarbon. REGALREZ™ hydrocarbon resins are available from Hercules Incorporated. ARKON™ P series resins are available from Arakawa Chemical (U.S.A.) Incorporated. Of course, the present invention is not limited to use of such three tackifying resins, and other tackifying resins which are compatible with the other components of the composition and can withstand the high processing temperatures, can also be used.

A pressure sensitive elastomer adhesive may include, for example, from about 20 to about 99 percent by weight elastomeric polymer, from about 5 to about 40 percent polyolefin and from about 5 to about 40 percent resin tackifier. For example, the particularly useful composition Kraton® G-2755 included, by weight, about 61 to about 65 percent KRATON® G-1659, about 17 to about 23 percent Polyethylene NA-601 (available from Quantum Chemical Co., Cincinnati, Ohio), and about 15 to about 20 percent REGALREZ® 1126.

For example, the elastic sheet 50 may be made from block copolymers having the general formula A—B—A' where A and A' are each a thermoplastic polymer endblock which contains a styrenic moiety such as a poly (vinyl arene) and where B is an elastomeric polymer midblock such as a conjugated diene or a lower alkene polymer. The elastic sheet 32 may be formed from, for example, (polystyrene/poly(ethylene-butylene)/polystyrene) block copolymers available from the Shell Chemical Company under the trademark KRATON® G. One such block copolymer may be, for example, KRATON® G-1659.

Other exemplary elastomeric materials which may be used to form elastic sheet 50 include polyurethane elastomeric materials such as, for example, those available under the trademark ESTANE® from B. F. Goodrich & Co., polyamide elastomeric materials such as, for example, those available under the trademark PEBAX® from ELF Atochem Company, and polyester elastomeric materials such as, for example, those available under the trade designation Hytrel® from E. I. DuPont De Nemours & Company. Formation of elastic sheets from polyester elastic materials is disclosed in, for example, U.S. Pat. No. 4,741,949 to Morman et al., hereby incorporated by reference.

A polyolefin may also be blended with the elastomeric polymer to improve the processability of the composition. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, propylene copolymers and butene copolymers. A particularly useful polyethylene may be obtained from the Quantum Chemical Co., Cincinnati, Ohio, under the trade designation Petrothene® NA601 (also referred to herein as PE NA601 or polyethylene NA601). Two or more of the polyolefins may be utilized. Extrudable blends of elastomeric polymers and polyolefins are disclosed in, for example, U.S. Pat. No. 4,663,220 to Wisneski et al., hereby incorporated by reference.

The elastic sheet 50 may also be a multilayer material in that it may include two or more individual coherent webs or sheets. Additionally, the elastic sheet 50 may be a multilayer material in which one or more of the layers contain a mixture of elastic and nonelastic fibers or particulates. An example of the latter type of elastic web, reference is made to U.S. Pat. No. 4,209,563, incorporated herein by reference, in which elastomeric and non-elastomeric fibers are commingled to form a single coherent web of randomly dispersed fibers. Another example of such a composite web would be one made by a technique such as disclosed in U.S. Pat. No. 4,100,324 issued to Richard A. Anderson et al., and also incorporated herein by reference. That patent discloses a nonwoven material which includes a mixture of meltblown thermoplastic fibers and other materials. The fibers and other materials are combined in the gas stream in which the meltblown fibers are born e so that an intimate entangled commingling of meltblown fibers and other materials, e.g., wood pulp, staple fibers or particulates such as, for example, hydrocolloid (hydrogel) particulates commonly referred to as super-absorbents occurs prior to collection of the fibers upon a collecting device to form a coherent web of randomly dispersed fibers.

The sheet 50 can alternatively be an array of strands, a nonwoven material, foam, or the like.

The sheet 50 is formed by any of a number of conventionally known processes, including but not limited to flat die extrusion, blown film (tubular) process, casting and the like. For a general description of forming a blown film, see Kirk-Othmer, "Encyclopedia of Chemical Technology," 4$^{th}$ ed., Vol. 10, p. 777, which is incorporate d by reference herein. A blown film may be desirable because the film molecules are oriented generally in the cross-direction, thus increasing the cross-direction strength. Normal casting of film orients the film molecules somewhat in the machine direction, thus decreasing the cross-direction strength.

For the purposes of the present discussion, the flat film extrusion formation process will be discussed as the preferred embodiment. Generally speaking, the sheet 50 may be extruded at a temperature suitable for conventional film extrusion processes for the particular elastomeric material. For example, a composition containing, by weight, about 61 to about 65 percent KRATON® G-1659, about 17 to about 23 percent Polyethylene NA-601, and about 15 to about 20 percent REGALREZ® 1126 may be extruded into an elastomeric sheet (e.g. pressure sensitive elastomer adhesive sheet) at a temperature of from about 360° to about 540° F.

The extruded, or otherwise formed, sheet 50 is deposited into the contact zone 34 so that the sheets 12 and 14 immediately sandwich the sheet 50. In a preferred embodiment the sheets 12 and 14 are advanced into the contact zone 34 such that the fiber vectors are in opposing directions, i.e., to the left and right of the machine direction, so that the multilayer material 54 formed has the sheet 12 having its fibers oriented in one direction and the sheet 14 having its fibers oriented in a generally crossed direction. This cross-directional layering produces a material having greater strength than unidirectional fiber laminates. In one experiment, the cross-directional layering of a first sheets having fiber vector of about +30° and a second sheet having fiber vector of about −30° from the machine direction axis produced a laminate having an approximately 10 percent increase in cross-direction tensile strength. Alternatively, each sheet may be formed in a multi-bank machine so some fibers are at predominantly about +30° and others at predominantly about −30°.

The sheets 12, 14, 50 are introduced into the nip 34 of a pressure roll arrangement 56. The pressure roll arrangement 56 may include at least a first pressure roll 58 and a second pressure roll 60 which can be set to define a controlled gap between the rolls. Alternatively, the pressure rolls 58 and 60 may be set to define a pressurized nip such that the rolls 58 and 60 are essentially in contact when no sheet is between the rolls (i.e., in the absence of material). Desirably, one or both of the rolls 58 and 60 may be chilled, which is believed to help cool the extruded polymer sheet so it more rapidly sets in bonding contact with the material 12, 14. The laminate material 62 which exits the nip 34 is now a unitary structure.

Alternatively, other bonding methods can be used to adhere the sheet 50 to the sheets 12 and 14, such as, but not limited to, adhesive, thermal, hydroentangling, ultrasonic, and other methods of laminating known to those skilled in the art.

Figure 2:
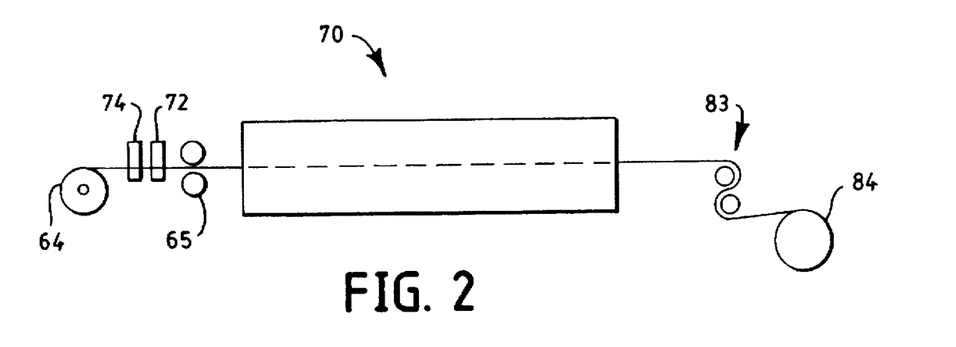
FIG. 2 is a side schematic view of an apparatus for performing the necking operation according to the method of the present invention.
Figure 3:
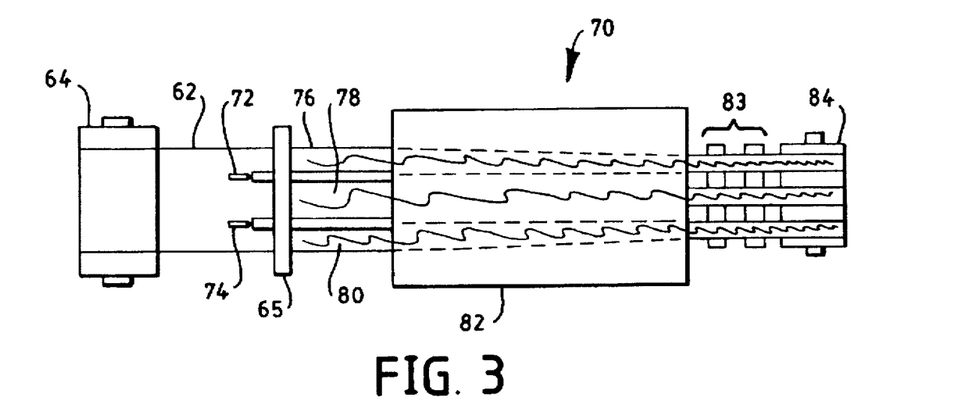
FIG. 3 is a top schematic view of an apparatus for performing the necking operation according to the method of the present invention.

The laminate material 62 can be wound on a supply roll 64 for storage. Alternatively, the material 62 can be moved directly to a necking assembly 70, as shown in FIGS. 2 and 3. In the former instance, the laminate material 62 is unwound from the supply roll 64, through a niproll 65 which provides material 62 at a controllable linear speed. At least one knife blade 72 and preferably a plurality of knife blades 74 are spaced across the width of the laminate material 62 and slit the material forming separately neckable slits of desired widths prior to the niproll 65. Any number of blades 74 can be used. It is to be understood that any suitable width material can be used and any desirable width slits can be formed by selecting the number and spacing of the blades 74. It is also to be understood that the present invention can be practiced without slitting the laminate 62 prior to necking.

The slits 76, 78 and 80 contact a source of heat, such as an oven 82 and are passed through an S-wrap assembly 83 and wound on a wind-up roll 84. Because the peripheral linear speed of the supply roll 64 is controlled to be lower than the peripheral linear speed of the wind-up roll 84, the slits 76, 78 and 80 are necked and tensioned as they are wound up on the common wind-up roll 84. Alternatively, a number of wind-up rolls 84 can be used, whereby each roll 84 winds up one of the slits 76, 78 and 80. The temperature of the oven 82 is preferably maintained from about 200° F. to about 270° F., more preferably from about 220° F. to about 255° F. The slits 76, 78 and 80 are contacted by the heat for a period of from about 0.1 to about 1.0 minute, although other durations are usable depending on laminate composition, necking conditions and product specifications desired. During this procedure the slits 76, 78 and 80 are necked to a narrower width. Alternatively, the heat source can be a series of heated rolls (not shown) around which the laminate 62 is passed and then stretched in a free span prior to being wound on the wind-up roll 84.

Prior processes used necked material which was subsequently laminated with an elastomer. An important advance of the present invention over the prior art is the lamination of the fabric to the elastic sheet, followed by necking under elevated temperature. The fabric layer or layers of the laminate are believed to act as a support structure for the elastic sheet when the laminate is heated. Upon heating, the elastic sheet softens and loses its memory. The laminate is necked to reduce its width, which, upon cooling imparts CD extensibility. Cooling locks the necked width into the memory of the elastomeric sheet. The present invention is a laminate having desirable CD elasticity compared to laminates of the prior art.

Additionally, an unexpected result of the present invention is the improved product formed by using a closed niproll during the lamination step. While one skilled in the art would normally expect a closed niproll to cause the elastic sheet to penetrate the fabric structure and thus decrease CD elasticity, the use of unnecked material appears to alleviate this effect, producing a fabric having improved breathability over previously made laminates. One possible explanation for this effect may be that during the closed nip lamination process, the fibers of the nonwoven web may be imbedded in and penetrate through the elastic film, and, upon subsequent heating and necking, the fibers may be pulled out of the film leaving a microporous film which is breathable and repellent. Additionally, the laminate formed with a closed gap niproll was essentially unpeelable without destruction.

Figure 4:
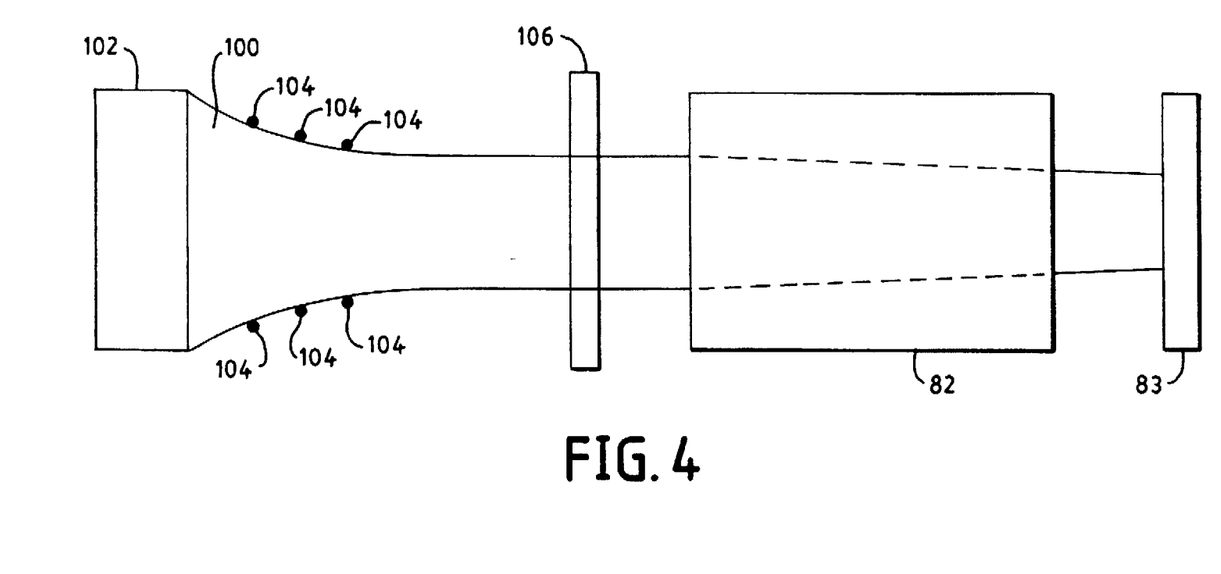
FIG. 4 is a top schematic view of an alternative embodiment in which the laminate is gathered prior to necking.

In an alternative embodiment, shown in FIG. 4, the laminate 100 is unwound from the supply roll 102 and gathered by guide rolls 104. The gathered material is then passed through a niproll 106 without applying appreciable tension to the laminate 100. Gathering is believed to reduce the smile profile by decreasing the CD distance from the edge to the center of the material. The guides 104 can be fixed rods, shafts, rollers, wheels, or the like, or be on bearings. The guide surface is preferably smooth so that the laminate 100 does not catch on the roll. The guides 104 are preferably present in pairs, one on either side of the laminate. Preferably, a plurality of pairs of guides 104, as shown in the drawings are present to more controllably guide the material. The gathering step does not apply appreciable tension to the laminate, i.e., the linear speed X of the supply roll 102 is not appreciably smaller than the linear rate Y of the niproll 106.

Gathering can be done prior to necking, which will improve the necking process. Gathering can be done without necking, as well. Furthermore, gathering can be done while necking.

The present invention can be used in personal care absorbent products as side tabs or ears on diapers, child care training pants, and the like which need to be strong and elastic, yet resistant to peeling. It is possible to construct entire products using the material of the present invention. Another use of the fabric of the present invention is as the side pieces in adult incontinence products and feminine care pants, where elasticity and breathability are important. Additionally, the present invention can be incorporated into protective apparel.

The invention will be further described in connection with the following examples, which are set forth for purposes of illustration only. Parts and percentages appearing in such examples are by weight unless otherwise stipulated.

EXAMPLES

Testing Methods and Definitions

Cycling Test. The equipment used was a Constant-rate-of-extension tensile tester, designated as Sintech 2, Model 3397-139, available from Sintech Corporation, Cary, N.C. Triplicate test specimens were cut, 4.5×3 inches, the 4.5" side being in the cross-machine direction. Each 3-inch wide specimen was clamped by two pneumatic jaws so that the gage length (jaw separation) was 2 inches, and the direction of pull was in the cross-machine direction. The pulling speed was set at 20 inches/min. Testing was done during two extension/retraction cycles, during which the specimen was first pulled to 100% elongation (4-inch jaw separation), the jaws then stopped and immediately returned to the starting gage length, then another extension-retraction cycle was repeated, finally the specimen was pulled to an extension where it broke, at which time the test was stopped. Force and extension were measured by an appropriate loadcell and other sensors, data were recorded and analyzed by a computer program.

The samples tested were characterized by the load (force) measured at 30% elongation during the first cycle extension (pull) mode, the load at 30% elongation during the second cycle retraction mode, the percent elongation a 2000 gram load, and by the break (peak) elongation and load.

Peel Test: In peel or delamination testing a laminate is tested for the amount of tensile force which will pull the layers of the laminate apart. Values for peel strength are obtained using a specified width of fabric, usually 4 inches (102 mm) clamp width and a constant rate of extension. The film side of the specimen is covered with masking tape or some other suitable material in order to prevent the film from ripping apart during the test. The masking tape is on only one side of the laminate and so does not contribute to the peel strength of the sample. The sample is delaminated by hand a sufficient amount to allow it to be clamped into position. The specimen is clamped in, for example, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Phila., Pa. 19154, which have 3 inch (76 mm) long parallel clamps. The sample specimen is then pulled apart at 180° of separation and the tensile strength recorded in pounds.

Breathability Test: A measure of the breathability of a fabric is the water vapor transmission rate (WVTR), which for the sample materials was calculated in accordance with ASTM Standard E96-80. Circular samples measuring three inches in diameter were cut from each of the test materials, and a control which was a piece of CELGARD® 2500 sheet from Celanese Separation Products of Charlotte, N.C. CELGARD® 2500 sheet is a microporous polypropylene sheet. Three samples were prepared for each material. The test dish was a number 60-1 Vapometer pan distributed by Thwing-Albert Instrument Company of Philadelphia, Pa. One hundred milliliters of water were poured into each Vapometer pan and individual samples of the test materials and control material were placed across the open tops of the individual pans. Screw-on flanges were tightened to form a seal along the edges of the pan, leaving the associated test material or control material exposed to the ambient atmosphere over a 6.5 centimeter diameter circle having an exposed area of approximately 33.17 square centimeters. The pans were place in a forced air oven at 100° F. (32° C.) for 1 hour to equilibrate. The oven was a constant temperature oven with external air circulating through it to prevent water vapor accumulation inside. A suitable forced air oven is, for example, a Blue M Power-O-Matic 60 oven distributed by Blue M Electric Company of Blue Island, Ill. Upon completion of the equilibration, the pans were removed from the oven, weighed and immediately returned to the oven. After 24 hours, the pans were removed from the oven and weighed again. The preliminary test water vapor transmission rate values were calculated as follows:

Test $WVTR = (\text{grams weight loss over 24 hours}) \times 315.5 \text{ g/m}^2/24 \text{ hours}$.

The relative humidity within the oven was not specifically controlled.

Under predetermined set conditions of 100° F. (32° C.) and ambient relative humidity, the WVTR for the CELGARD® 2500 control has been defined to be 5000 grams per square meter for 24 hours. Accordingly, the control sample was run with each test and the preliminary test values were corrected to set conditions using the following equation:

$WVTR = (\text{Test } WVTR/\text{control } WVTR) \times (5000 \text{ g/m}^2/24 \text{ hours})$ Hydrohead Test. A measure of the liquid barrier properties of a fabric is the hydrohead test. The hydrohead test determines the height of water (in centimeters) which the fabric will support before a predetermined amount of liquid passes through. A fabric with a higher hydrohead reading indicates it has a greater barrier to liquid penetration than a fabric with a lower hydrohead. The hydrohead test is performed according to Federal Test Standard No. 191A, Method 5514.

Example 1
Closed Niproll Assembly

Two rolls of 0.85 osy basis weight, wire weave bond pattern spunbond polypropylene fabric, 65" wide, were laminated by extruding Kraton® G2755 molten film, 28–30 gsm basis weight, between the spunbond layers, nipping the laminate between a water-cooled roll and a rubber-covered roll to adhere the layers and solidify/cool the film.

Processing conditions on the extrusion coating line were as follows: Kraton® polymer melt temperature about 480° F., extruder screw of 32 rpm, winder speed of 65 yards/minute, laminated width of 62". Yardage was made so that the niprolls were fully closed on the laminate being made. Three cuts were made into the laminate near the middle of the roll to give two sample slits 1A and 1B, each 13.75" wide, which were wound up on a common core. The laminated web was then taken to an oven of about 30 ft length. The oven temperature was set at 240° F. The laminate, which was not elastic in any direction, was then pulled through the oven, allowing the laminate to freely elongate and neck. The speed differential between the unwind and the winder was increased until the 13.75" slits narrowed to about 5" (63.6% neck-in). Necking process conditions for the web had been made with closed laminating niprolls were as follows: line speed into the oven: 72 fpm, line speed out: 104 fpm, oven temperature cycling up to 251° F., slits necked to 4.8", temperature of the web at the winder: 107°–109° F. (via infrared pyrometer).

Table 1 shows sample 1A and Table 2 shows sample 1B results of the cycling test. Five repetitions were used.

TABLE 1

| | Sample 1A | | | | |
|---|---|---|---|---|---|
| | Load 1st 30% Up Gm | Load 2nd 30% Down Gm | Elong. @ Stop Load % | Elong. @ Peak % | Load @ Peak Gm |
| Mean | 647.63 | 72.62 | 122.09 | 318.0 | 9501.1 |
| Standard Dev. | 15.54 | 5.41 | 3.29 | 20.4 | 469.0 |

TABLE 2

| | Sample 1B | | | | |
|---|---|---|---|---|---|
| | Load 1st 30% Up Gm | Load 2nd 30% Down Gm | Elong. @ Stop Load % | Elong. @ Peak % | Load @ Peak Gm |
| Mean | 668.35 | 77.56 | 118.37 | 318.7 | 9821.2 |
| Standard Dev. | 9.25 | 3.31 | 1.59 | 10.8 | 283.7 |

Example 2
Gapped Niproll Assembly

The elastomer lamination procedure of Example 1 was followed, but the laminating niprolls were separated by spacers to give a measured 0.030" gap. Necking process conditions for the web laminated with the 0.030" niproll gap were: line speed in: 78 fpm, line speed out: 103 fpm, oven temperature: 220°–256° F., sample slits 2A and 2B were necked to 5", web temperature at the winder: 113°–115° F. Cycling test results are shown in Tables 3 and 4 for samples 2A and 2B. Five repetitions were used.

TABLE 3

| | Sample 2A | | | | |
|---|---|---|---|---|---|
| | Load 1st 30% Up Gm | Load 2nd 30% Down Gm | Elong. @ Stop Load % | Elong. @ Peak % | Load @ Peak Gm |
| Mean | 340.74 | 20.75 | 124.95 | 265.3 | 9337.0 |
| Standard Dev. | 8.35 | 3.31 | 2.52 | 6.1 | 71.9 |

TABLE 4

| | Sample 2B | | | | |
|---|---|---|---|---|---|
| | Load 1st 30% Up Gm | Load 2nd 30% Down Gm | Elong. @ Stop Load % | Elong. @ Peak % | Load @ Peak Gm |
| Mean | 403.33 | 28.65 | 129.77 | 278.8 | 9092.0 |
| Standard Dev. | 17.72 | 3.75 | 2.71 | 15.4 | 509.6 |

Material samples 1A, 1B, 2A, and 2B off the winder displayed good CD elasticity.

Table 5 shows the results of the peel test for the gapped niproll laminates after necking. Five repetitions were used. With the closed gap samples 1A and 1B the spunbond layer could not be peeled off intact from the sheet, indicating the peel strength of the laminate exceeded the peel strength of the spunbond fabric; therefore, the samples 1A and 1B could not be tested for peel resistance.

TABLE 5

| | Sample 2A | |
|---|---|---|
| | Average Load Gm | Scatter Index Gm |
| Mean | 215.34 | 40.10 |
| Standard Dev. | 8.80 | 4.88 |

TABLE 6

| | Sample 2B | |
|---|---|---|
| | Average Load Gm | Scatter Index Gm |
| Mean | 333.20 | 33.06 |
| Standard Dev. | 25.30 | 10.68 |

Table 7 shows the results of the Water Vapor Transmission Rate (WVTR) Test. Standard control is assumed to have 5000 g/m²/24 hours water-vapor-transmission-rate. Three tests were done per sample.

TABLE 7

| Sample | WVTR |
|---|---|
| CELGARD CONTROL (CC) | |
| $CC_1$ | 5089 |
| $CC_2$ | 5000 |
| $CC_3$ | 5079 |
| Average | 5056 |
| Std. Dev. | 49 |
| NBL CONTROL (NC) | |
| $NC_1$ | 114 |
| $NC_2$ | 104 |
| $NC_3$ | 129 |
| Average | 116 |
| Std. Dev | 13 |
| TEST SAMPLE 1A | |
| $1A_1$ | 2513 |
| $1A_2$ | 3045 |
| $1A_3$ | 3888 |
| Average | 3149 |
| Std. Dev. | 694 |
| TEST SAMPLE 1B | |
| $1B_1$ | 3077 |
| $1B_2$ | 3102 |
| $1B_3$ | 3016 |
| Average | 3065 |
| Std. Dev. | 44 |
| TEST SAMPLE 2A | |
| $2A_1$ | 154 |
| $2A_2$ | 167 |
| $2A_3$ | 141 |
| Average | 154 |
| Std. Dev. | 13 |

Sample CC was a test control composed of CELGARD® 2500 film. Sample NC was a reversibly necked NBL control produced according to the process disclosed in U.S. Pat. No. 5,336,545. Samples 1A and 1B were a reversibly necked NBL according to Example 1, i.e., where the niproll gap was closed. Sample 2A was the extrusion laminated material at a 30-mil niproll gap, then necked. As Table 7 indicates, the WVTR rate for the closed gap samples 1A and 1B was about 3000, and averaged more than 26 times greater WVTR than the necked NBL sample NC rate. The practical upper limit of WVTR may be about 5000. Sample 2A, using the gapped niproll, was essentially not breathable, as is standard NBL.

Table 8 shows the water resistance, or hydrohead, test results.

TABLE 8

| Sample ID | Column Height (cm) |
|---|---|
| 1A | 35.5 |
| 1B | 39.0 |
| 2A | 33.0 |
| 2B | 36.0 |

Column height is the water column height needed to observe a second drop appearing under the test fabric.

Breathability has a definite effect on comfort. High WVTR allows more moisture to pass through the fabric, providing greater wearer comfort. A high liquid barrier (as measured by the hydrohead test) is desirable to prevent leakage, such as in diapers or as an outer cover, such as in surgical protective garments, to prevent blood and other fluids from passing through, but providing good breathability. Sample 1A averaged 3149 and sample 1B averaged 3065 in the WVTR test, indicating superior breathability of the laminated fabric. Breathability of the laminate formed by the closed niproll assembly gap was superior to the laminate formed using an open niproll assembly gap.

Example 3

An alternative method takes a premade elastic sheet, pressure-laminates it (if tackified) or adhesive (sprayed on) laminates it to facings, then necks the laminate as described above. One can also start with an elastic sheet made by the tubular (blown) process, collapsing the tube into a flattened tube so that it does not have thickened edges as is common to cast films, and then use the flattened tube to make the inelastic laminate, which is subsequently necked. This alternative would eliminate the cast sheet thickness variability.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

It should further be noted that any patents, applications or publications referred to herein are incorporated by reference in their entirety.

We claim:

1. A cross-direction extensible elastic laminate produced by laminating at least one fibrous layer to at least one elastic layer and subsequently necking and heating said laminate.

2. The laminate of claim 1, wherein said at least one fibrous layer is selected from the group consisting of a woven and a nonwoven fibrous layer.

3. The laminate of claim 2, wherein said nonwoven fibrous layer is selected from the group consisting of a layer of spunbonded fibers, a layer of meltblown fibers, and a multilayer material including at least one of said layers.

4. The laminate of claim 2, wherein said fibrous layer has been previously necked and relaxed prior to lamination.

5. The laminate of claim 2, wherein said woven fibrous layer is selected from a knit material and a loosely woven material.

6. The laminate of claim 1, wherein said at least one elastic layer is selected from the group consisting of a sheet, an array of strands, a nonwoven material and a foam.

7. The laminate of claim 6, wherein said at least one elastic layer is formed from an thermoplastic elastomeric polymer.

8. The laminate of claim 7, wherein said at least one elastic layer is selected from the group consisting of elastic polyesters, elastic polyurethanes, elastic polyamides, elastic polyolefins, and elastic A—B—A' block copolymers, wherein A and A' are the same or different thermoplastic polymers, and wherein B is an elastomeric polymer block.

9. The laminate of claim 1, wherein said at least one elastic layer is formed from a blend of an elastomeric polymer and a tackifying resin.

10. The laminate of claim 1, wherein said at least one elastic layer is formed by a process selected from the group consisting of flat die extrusion, tubular blown film extrusion and casting.

11. The laminate of claim 1, wherein said lamination is achieved by a bonding process selected from the group consisting of adhesive, thermal, hydroentangling, and ultrasonic.

12. The laminate of claim 1, wherein said lamination is achieved by contacting a softened elastic layer with said at least one fibrous layer under pressure.

13. The laminate of claim 12, wherein said pressure is applied by a pair of niprolls.

14. The laminate of claim 13, wherein said niprolls are closed.

15. The laminate of claim 1, wherein said elastic laminate is defined as having at least about 55% recovery, within about one minute, at about 60% elongation.

16. The laminate of claim 1, wherein said necking is achieved by stretching and heating said laminate.

17. The laminate of claim 16, wherein said stretching is performed while heating said laminate.

18. The laminate of claim 16, wherein said heating is achieved by contacting said laminate with a heat source.

19. The laminate of claim 18, wherein said heat is at a temperature of from about 200° F. to about 270° F.

20. The laminate of claim 18, wherein said heat is at a temperature of from about 220° F. to about 255° F.

21. An item of protective apparel containing the laminate of claim 1 selected from the group consisting of a surgical gown, an isolation gown, coveralls, and a laboratory coat.

22. A personal care absorbent product containing the laminate of claim 1 selected from the group consisting of a diaper, a feminine hygiene product, an adult incontinence product and training pants.

23. A cross-direction extensible elastic laminate produced by laminating at least one unnecked fibrous layer to at least one elastic layer, gathering said laminate and subsequently necking and heating said laminate.

24. The laminate of claim 23, wherein said gathering is achieved by passing a length of laminate between at least one pair of guides which cause the width of said laminate to be reduced.

25. An elastic, laminated fabric comprising at least one fibrous layer and one elastic layer, wherein said fabric has a hydrohead and a water vapor transmission rate and wherein said water vapor transmission rate is at least about 1000 g/m²/24 hours.

26. The fabric of claim 25, wherein said water vapor transmission rate is from about 1,500 to about 5,000.

27. The fabric of claim 25, wherein said water vapor transmission rate is from about 2,000 to about 3,500.

28. The fabric of claim 25, wherein said hydrohead is at least about 30 cm.

29. The fabric of claim 26, wherein said hydrohead is at least about 30 cm.

30. The fabric of claim 27, wherein said hydrohead is at least about 30 cm.

31. An elastic, laminated fabric comprising at least one fibrous layer and one elastic layer, wherein said fabric has a hydrohead and a water vapor transmission rate and wherein the water vapor transmission rate is at least about 1000 g/m²/24 hours and the hydrohead is at least about 30 cm.

32. A cross-direction extensible elastic laminate produced by laminating at least one fibrous layer which has been previously necked and relaxed to at least one elastic layer and subsequently necking and heating said laminate.

33. A method for producing a laminated fabric having improved cross-directional extensibility, comprising the steps of:

a) providing at least one sheet of fabric;
b) laminating said sheet to at least one layer of elastic material;
c) necking said laminate; and,
d) heating said laminate.

34. The method of claim 33, wherein said at least one fibrous layer is selected from the group consisting of a woven and a nonwoven fibrous layer.

35. The method of claim 34, wherein said nonwoven fibrous layer is selected from the group consisting of a layer of spunbonded fibers, a layer of meltblown fibers, and a multilayer material including at least one of said layers.

36. The method of claim 34, wherein said fibrous layer has been previously necked and relaxed prior to lamination.

37. The method of claim 34, wherein said woven fibrous layer is selected from a knit material and a loosely woven material.

38. The method of claim 33, wherein said at least one elastic layer is selected from the group consisting of a sheet, an array of strands, a nonwoven material and a foam.

39. The method of claim 38, wherein said at least one elastic layer is formed from an thermoplastic elastomeric polymer.

40. The method of claim 39, wherein said at least one elastic layer is selected from the group consisting of elastic polyesters, elastic polyurethanes, elastic polyamides, elastic polyolefins, metallocenes and elastic A—B—A' block copolymers, wherein A and A' are the same or different thermoplastic polymers, and wherein B is an elastomeric polymer block.

41. The method of claim 33, wherein said at least one elastic layer is formed from a blend of an elastomeric polymer and a tackifying resin.

42. The method of claim 33, wherein said at least one elastic layer is formed by a process selected from the group consisting of flat die extrusion, tubular blown film extrusion and casting.

43. The method of claim 33, wherein said lamination is achieved by a bonding process selected from the group consisting of adhesive, thermal, hydroentangling, and ultrasonic.

44. The method of claim 33, wherein said lamination is achieved by contacting a softened elastic layer with said at least one fibrous layer under pressure.

45. The method of claim 44, wherein said pressure is applied by a pair of niprolls.

46. The method of claim 42, wherein said niprolls are closed.

47. The method of claim 33, wherein said elastic laminate is defined as having at least about 55% recovery, within about one minute, at about 60% elongation.

48. The method of claim 33, wherein said necking is achieved by stretching and heating said laminate.

49. The method of claim 48, wherein said stretching is performed while heating said laminate.

50. The laminate of claim 49, wherein said heating is achieved by contacting said laminate with a heat source.

51. The laminate of claim 50, wherein said heat is at a temperature of from about 200° F. to about 270° F.

52. The laminate of claim 50, wherein said heat is at a temperature of from about 220° F. to about 255° F.

53. A method for producing a laminated fabric having improved cross-directional extensibility, comprising the steps of:
   a) providing at least one sheet of fabric;
   b) laminating said sheet to at least one layer of elastic material;
   c) gathering said laminate;
   d) necking said laminate; and,
   e) heating said laminate.

54. A method for producing a laminated fabric having improved cross-directional extensibility, comprising the steps of:
   a) providing at least one sheet of fibrous material;
   b) necking said fibrous material;
   c) relaxing said fibrous material
   d) laminating said fibrous material of step c) to at least one layer of elastic material;
   e) necking said laminate; and,
   f) heating said laminate.

* * * * *